US006063241A

United States Patent [19]

Münch et al.

[11] Patent Number: 6,063,241

[45] Date of Patent: May 16, 2000

[54] HEADBOX WITH PULP CONSISTENCY CONTROL

[75] Inventors: Rudolf Münch, Königsbronn/Zang; Ulrich Begemann, Heidenheim, both of Germany

[73] Assignee: Voith Sulzer Papiermaschinen GmbH, Heidenheim, Germany

[21] Appl. No.: 08/921,024

[22] Filed: Aug. 29, 1997

[30] Foreign Application Priority Data

Aug. 30, 1996 [DE] Germany ........................... 196 34 996

[51] Int. Cl.[7] ........................................ D21F 1/08

[52] U.S. Cl. .......................... 162/258; 162/198; 162/259; 162/DIG. 11

[58] Field of Search .................................... 162/258, 259, 162/DIG. 10, 198, 343, DIG. 11, 216, 336

[56] References Cited

U.S. PATENT DOCUMENTS

| | | | |
|---|---|---|---|
| 3,296,066 | 1/1967 | Green et al. . | |
| 3,307,215 | 3/1967 | Gerhard et al. | 162/DIG. 11 |
| 3,498,719 | 3/1970 | Wing | 162/198 |
| 3,619,360 | 11/1971 | Persik, Jr. | 162/DIG. 11 |
| 3,666,621 | 5/1972 | Adams | 162/258 |
| 3,852,578 | 12/1974 | Rice | 162/DIG. 11 |
| 5,573,642 | 11/1996 | Begemann | 162/190 |
| 5,707,495 | 1/1998 | Heinzmann et al. | 162/258 |

FOREIGN PATENT DOCUMENTS

| | | |
|---|---|---|
| 0635600 | 1/1995 | European Pat. Off. . |
| 2025088 | 1/1980 | United Kingdom . |
| 89/11561 | 11/1989 | WIPO . |

*Primary Examiner*—Karen M. Hastings
*Attorney, Agent, or Firm*—Greenblum & Berstein, P.L.C.

[57] ABSTRACT

Consistency-controlled headbox for a paper machine with a common feed line for a pulp slurry, a plurality of feed line sections into which the common feed line branches, and a system for influencing the composition of the slurry flows in each of the plurality of feed line sections. At least one pulp consistency sensor is provided for sectional pulp consistency control, which may be located in a return portion of the pulp distributing line. A weight basis cross-sectional adjustment sensor and controller may also be used; with the pulp consistency controller arranged to operate with a significantly higher sensing rate than the weight basis cross-sectional adjustment controller.

30 Claims, 1 Drawing Sheet

14
18
20
12
10
21
16
9
6
5
22''''
22'''
22'
22
3
4
8
1
2
7
22''

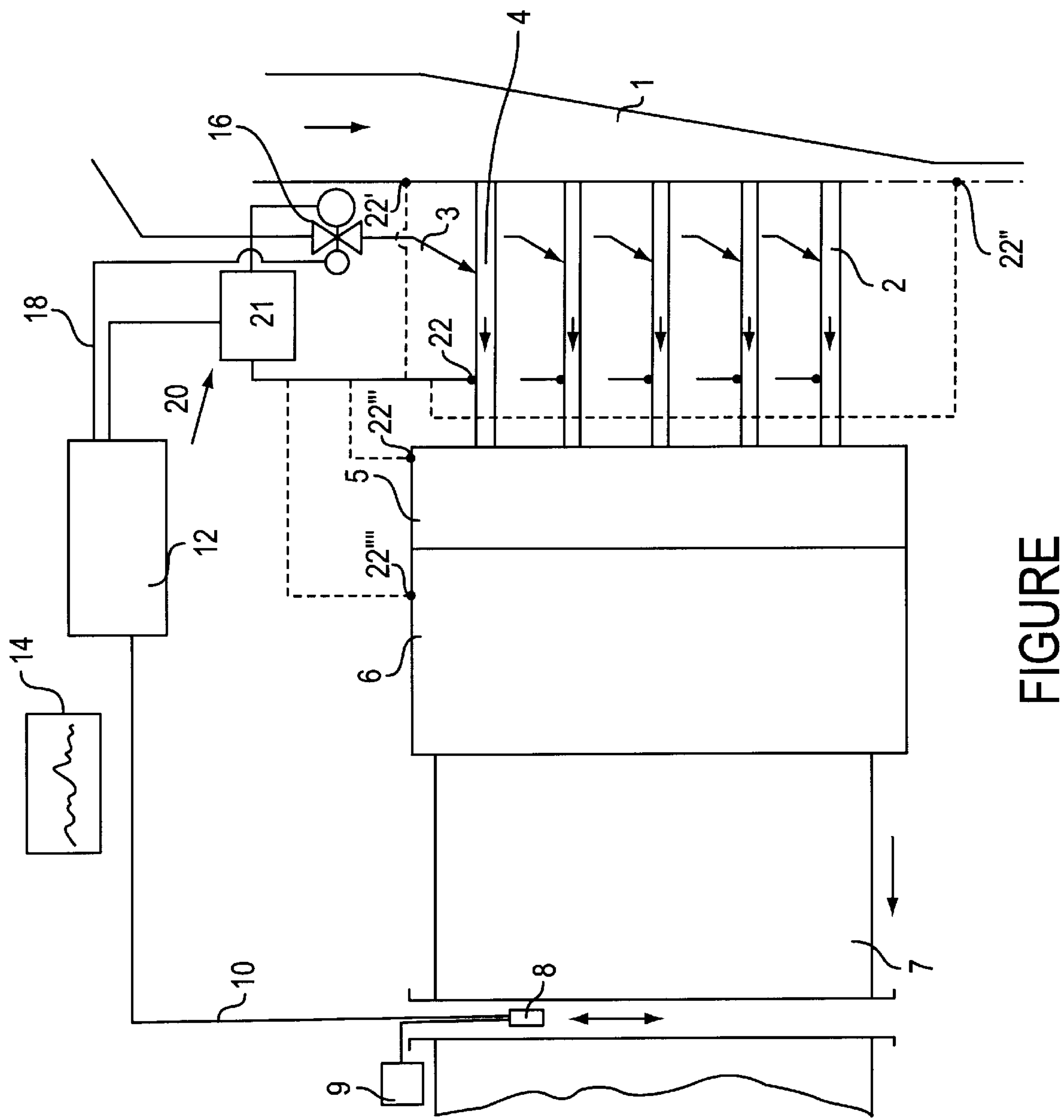
FIGURE

HEADBOX WITH PULP CONSISTENCY CONTROL

CROSS-REFERENCE TO RELATED APPLICATION

The present invention claims the priority under 35 U.S.C. § 119 of German Application No. 196 34 996.6 filed Aug. 30, 1996, the disclosure of which is expressly incorporated by reference herein in its entirety.

BACKGROUND OF THE INVENTION

1. Field of the Invention

The present invention relates to a headbox of a paper machine that includes a common feed line for a pulp slurry, a plurality of feed line sections into which the common feed line branches, and a device for influencing the composition of the pulp slurry flows in each of the feed line sections. The present invention also relates to a control device for a headbox of a paper machine wherein a cross-sectional profile sensor captures the weight basis of a paper web, and the control device controls the cross-sectional profile of the web and includes a device for influencing the composition of the pulp slurry in each of a plurality of feed line sections. The present invention also relates to a process for controlling a headbox of a paper machine which includes determining the weight basis cross-sectional profile of a paper web outside the headbox at a sensing rate, comparing this cross-sectional profile with a set point, and actuating a final control element in each section of the headbox in the event of variation between the actual value and the set point.

2. Discussion of Background Information

In the current state of the art, as shown by German Patent DE 43 16 054, a headbox of a paper machine is known which, at least in part, is formed of sections, enabling one to sectionally influence a feed pulp slurry. In headboxes of this type a weight basis cross-sectional control adjustment can occur, such that the pulp density is changed by section, while the fiber orientation cross-sectional profile is adjusted by sectionally altering the volumetric flows. The metered addition of diluting fluid generally is regulated by a control device. The actual cross-sectional profile of the pulp stream is thus determined outside the headbox, for example, in the screen section of the paper machine at certain time intervals $\Delta T$, and the actual cross-sectional profile is compared with set points stored in a control device. As a result of fluctuations between the actual and desired profiles, the pulp consistency is adjusted to the desired value or set point by actuating the control elements in the individual sections of the headbox. Headboxes, which operate with this type of cross-sectional profile control are shown, for example, in German Patent DE 42 39 845, the disclosure of which is hereby incorporated by reference.

However, the cross-sectional quality which can be achieved with such weight basis cross-sectional adjustment controllers is limited, in particular due to the longitudinal weight basis fluctuations occurring in certain processing systems. A primary cause for such longitudinal weight basis fluctuations is the occurrence of consistency fluctuations in the pulp stream. The main causes for consistency fluctuations in the pulp stream, in turn, are variations in thick matter and water in the screen, as well as uneven mixing of thick matter and water in the screen. De-mixing processes can also occur in the feed lines due to surface wall abrasion. It is also possible that interference in the control circuit, such as an actuator hysteresis, as well as measuring noise and regulator parameterization, can result in fluctuating metered quantities of thick material. Additionally, consistency fluctuations can occur in the headbox due to transient effects after a grade change, or after start-up of the processing system.

With previously known processes for controlling pulp stream consistency, the poor quality of measuring signals of the weight basis longitudinal profile were unable to suppress such consistency fluctuations. Moreover, the unavoidable weight basis longitudinal and residual profile variations result in a type of process noise, when measuring the actual cross-sectional profile. In order to accurately measure values for cross-sectional profile control, the process noise has to be suppressed by filtering the measurements. Due to this filtering, however, actuation of the cross-sectional control only occurs at large time intervals and/or with an inadequately low amplitude. As a result, the transient response of the control system slows down, and the cross section, which is adjustable by means of the control system, is limited by the random portion in the cross-sectional profile due to noisy profile data.

SUMMARY OF THE INVENTION

In view of the foregoing, it is an object of the present invention to provide a headbox in which longitudinal profile interferences are reduced. It also is an object of the present invention to provide a control device and a process for controlling a headbox of a paper machine which allows improved and faster extraction of web cross-sectional profile from noisy profile data, and therefore allows more precise control of the headbox than the prior art.

According to the present invention, pulp consistency may be controlled in each individual section of the headbox. This allows for an improved and faster method of balancing the longitudinal web profile variations caused by consistency fluctuations in the feed pulp suspension. The web profiles recorded by the weight basis cross-sectional adjustment sensors located in an area behind the headbox of the paper machine encounter less noise, and therefore can be determined more quickly. This allows fast stabilization of potential cross-sectional variations. The determination of the pulp consistency via pulp consistency sensors is possible at various locations of the headbox. In a very cost-effective embodiment of the present invention, the pulp consistency sensor can be placed in the common pulp feed line, but it can also be placed in the return line.

In a particular embodiment of the present invention, each pulp feed line section is allocated its own pulp consistency sensor, enabling exact stabilization of the longitudinal profile variations in each section of the paper web. This contrasts with adjusting the consistency of the mean composition of the common feed of the distributing pipe, for example.

According to the present invention, pulp consistency sensors may use measuring principles to determine pulp consistency based on variations or fluctuations around a given mean value, rather than determining consistency based on an absolute value. These variations or fluctuations, however, have to be determined at very high resolution. Therefore, a particular embodiment of the invention provides a pulp consistency sensor that uses a light signal as a measuring device. On the basis of this measuring system, pulp consistency may be determined based on light scattering or light reflection, or via a particle counter.

According to another embodiment of the invention, the pulp consistency sensor includes a laser light source and a photo diode that detects the light signal. The number of particles passing through the section of the headbox in which the pulp consistency sensor is placed can be counted per unit time with this configuration. From this information, the variation with respect to a given mean value can be determined. However, it is not necessary to determine the exact number of particles since only variations of consistency have to be determined. Thus, in another embodiment of the invention that represents a modification of the above, it is acceptable to use an even more indirect measurement technique, for example, by determining the number of light-dark transitions per second on the photo diode or its "flickering intensity." Instead of using a light as a measuring signal, it is also possible to measure pulp consistency based on other measuring techniques, such as with microwave signals, for example.

The present invention also provides a control device for a sectioned headbox which, in addition to the weight basis cross-sectional adjustment controller for the longitudinal cross-sectional profile, includes a pulp consistency controller which is located subjacent to the weight basis cross-sectional adjustment controller. Thus, the pulp consistency controller may be inserted in the feed line after the weight basis cross-sectional adjustment controller. The pulp consistency controller generally operates at substantially higher control speeds than the weight basis cross-sectional adjustment controller, as the pulp consistency is a fast changing variable compared with the weight basis cross-sectional adjustment.

According to another aspect of the present invention, the set point for the pulp consistency controller, with respect to which fluctuations are determined and consistency control is activated, is determined from the actual weight basis cross-sectional profile values which were determined by the weight basis cross-sectional adjustment sensor outside the headbox.

According to another aspect of the present invention, differential signals which are generated with respect to a given set point, due to variations of pulp consistency, may be used as the basis for pulp consistency control, rather than using the absolute value of pulp consistency as the basis for such control. As pulp consistency is a fast changing variable, it is particularly advantageous to input this variable at a higher scanning rate than the weight basis cross-sectional profile.

The present invention provides a headbox of a paper machine that includes a common feed line for a pulp slurry, a plurality of sections into which the common feed line branches, and a system for influencing the composition of the pulp slurry in each of the plurality of sections, wherein a pulp consistency sensor is provided for sectional consistency control. The pulp consistency sensor is positioned in the plurality of sections of the headbox. Additionally, the pulp consistency may be positioned in each section of the headbox, in a return portion of a pulp distributing line, and/or in the common feed line. Further, the consistency control may be based on fluctuation control. Moreover, the pulp consistency sensor may use a light signal as a measuring signal, and the sensor may include a laser light source and a photo diode for capturing the light signal. Alternatively, the pulp consistency sensor may use a microwave signal as measuring signal. Further, the plurality of sections of the headbox may be provided with a separate pulp feed line.

The present invention also provides a control device for a headbox of a paper machine that includes a weight basis cross-sectional adjustment sensor for capturing the weight basis cross-sectional profile of a paper web, a control device for controlling the weight basis cross-sectional profile, and a system for influencing the composition of a pulp slurry stream in each of a plurality of sections of the headbox. The control device includes a pulp consistency controller and a weight basis cross-sectional adjustment controller in each of the plurality of sections of the headbox. The control device may operate with a set point for the pulp consistency controller which is given by a control computer based on the weight basis cross-sectional profile of the paper web. Further, the pulp consistency controller may include a pulp consistency sensor which generates a differential signal if the pulp slurry consistency varies from a given set point. Additionally, the pulp consistency controller operates at a significantly higher sensing rate than the weight basis cross-sectional adjustment controller. According to this aspect of the invention, the plurality of sections of the headbox are constructed with at least one section having a separate pulp feed line.

The present invention further provides a process for controlling a headbox of a paper machine that includes determining a weight basis cross-sectional profile of a paper web outside the headbox at a sensing rate of $\Delta T$, comparing the weight basis cross-sectional profile with a first set point stored in a control device, actuating a final control element in a section of the headbox in the event of variation between the weight basis cross-sectional profile and the first set point, determining a pulp slurry's pulp consistency at an arbitrary location in the headbox at a sensing rate of $\Delta t$, comparing the pulp slurry's pulp consistency with a second set point, and actuating a final control element in a section of the headbox in the event of variation between the pulp slurry's pulp consistency and the second set point.

This process may further include determining the pulp slurry's pulp consistency based on a measured deviation from the second set point. According to this process, the second set point may be based on the weight basis cross-sectional profile of the paper web. Moreover, the sensing rate $\Delta t$ for determining the pulp slurry's pulp consistency is much faster than the sensing rate $\Delta T$ of the weight basis cross-sectional profile. Alternatively, the sensing rate $\Delta t$ for determining the deviation of the pulp slurry's pulp consistency from a given set point is much faster than the sensing rate $\Delta T$ of the weight basis cross-sectional profile.

Further, it is noted that it is within the purview of the present invention that the aforementioned and following characteristic features can be used not only in the described combinations, but also in other combinations or alone, without departing from the scope of the invention. Further embodiments and advantages can be seen from the detailed description and the accompanying figure.

BRIEF DESCRIPTION OF THE DRAWING

The present invention is further described in the detailed description which follows, in reference to the noted drawing by way of non-limiting examples of preferred embodiments of the invention, wherein:

The FIGURE illustrates a schematic representation of the headbox, associated control device, and starting section of a paper web in accordance with the present invention.

DETAILED DESCRIPTION OF THE INVENTION

The particulars shown herein are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

The sectioned headbox shown in the FIGURE is an example of a consistency-controlled headbox that includes a central feed line 1 for a pulp slurry. The feed line branches into a plurality of sections. In this embodiment of the invention, the sections of the headbox are constructed as individual pulp feed lines 2. The pulp slurry is injected via the common feed inlets and is distributed to the individual pulp feed lines 2. At least one diluting medium feed line 3 is provided for each of the plurality of pulp feed line sections by which the diluting medium, such as diluting water or diluted pulp slurry, can be fed into the corresponding pulp feed line 2. The consistency of the pulp slurry can thus be adjusted in the corresponding feed line 2, located behind the mixing location 4, to a desired value which, of course, also corresponds to the sections of the headbox.

The pulp slurry is fed into a sectioned turbulence generator 5 of the headbox via the individual pulp slurry feed lines 2. The pulp is transferred by a nozzle onto a wire screen to create a paper web 7. The weight basis cross-sectional profile is measured at a certain distance from the pulp transfer nozzle 6 by means of a weight basis cross-sectional adjustment sensor 8 which traverses perpendicular to the run direction of the paper web, as shown in the FIGURE. Sensor 8 may be driven by an electric motor 9. The data gathered from sensor 8 is transmitted over a measuring line 10 to a control computer 12, and the paper web's weight basis cross-sectional profile, as depicted by reference number 14, is calculated by control computer 12.

Without the above-described headbox consistency control, the paper web's weight basis cross-sectional profile measurement is very noisy, due to longitudinal fluctuations in the weight basis. In order to suppress this noise, filters are used in conventional configurations. As a result, the control actuation of the cross-sectional profile occurs only rarely, or with an inadequate amplitude.

The inventive control device is similar to the control devices presented in German Patent DE 42 39 845, in that it controls a paper web's weight basis cross-sectional adjustment, and it is actuated by means of a control computer 12. The computer also activates the respective final control elements 16, which are allocated to individual diluting medium feed lines 3. Final control elements 16 preferably comprise actuator valves. Particularly preferred are electromagnetic actuator valves, which are controllable via line 18.

According to the present invention, in addition to weight basis cross-sectional profile control as described in German Patent DE 42 39 845, an additional pulp consistency control device 20 is allocated to each individual pulp feed line 2. According to a preferred embodiment of the invention, the pulp consistency controller can be inserted after, or be subjacent to, the weight oasis cross-sectional adjustment controller. This pulp consistency controller includes a control device 21 for each section or each individual pulp feed line 2. A pulp consistency sensor 22 is connected to the control device 21. According to one embodiment of the inventive headbox, each pulp feed line 2 is provided with a pulp consistency sensor 22, which is positioned downstream from the mixing location 4. Of course, it is also possible to place the pulp consistency sensor in a different location within the headbox. For example, the pulp consistency sensor may be positioned in turbulence generator 5 as shown at 22'", or in pulp transfer nozzle 6, as shown at 22'". Further yet, according to another embodiment of the present invention, the pulp consistency sensor may be positioned in the common feed line 1, as shown at 22', instead of being positioned in the individual pulp feed lines 2.

The measuring signal determined by consistency sensor 22 is transmitted to the corresponding control devices 21 of the pulp feed lines 2. According to the measuring signal, final control elements 16 are actuated to provide additional diluting water in the respective pulp feed line 2, or to effect global changes in the water volume. As illustrated in the FIGURE, control element 16 is used as the control element for the weight basis cross-sectional adjustment controller and as the control element for the pulp consistency control, and only one diluting medium feed line 3 is provided for each pulp feed line 2. Of course, it would be possible to provide separate diluting medium feed lines with separate control elements, of which one serves as the weight basis cross-sectional adjustment control and another serves the consistency control. According to a further embodiment of the present invention, consistency sensors 22 can also be positioned in the return line as shown at 22".

Even with different configurations of the consistency sensors, the essential inventive concept of separate consistency control in each feed line 2 of the sectional headbox is satisfied. The pulp consistency sensors may determine an absolute value for pulp consistency, or the sensors may transmit the variation from a given value. Sensors of this type include particle counters which use light as a measuring signal. With particle counter sensors, which may include a photodiode and a device for generating a laser beam, consistency fluctuations can be determined very accurately. Moreover, instead of determining an absolute number of particles, the number of light-dark transitions of the photo diode per second, or the "flickering intensity" at the photo diode, may be used as a consistency fluctuation control variable. Other light-based measuring techniques for determining consistency fluctuations include light scattering and light reflection. Instead of using light-based signals, other measuring signals sensitive to the consistency fluctuations of the pulp slurry also can be used. For example, microwave signals may be used in the pulp slurry, where the response function for the purpose of variation control is based on the flow of pulp slurry.

According to the present invention, consistency fluctuations of the pulp headbox can be controlled in each individual pulp feed line 2 of the sections of the headbox, achieving a very high cut-off frequency. A weight basis cross-sectional profile emerges at sensor 8 which, in contrast to previous signals, is significantly less noisy and thus allows a faster and more exact actuation of weight basis cross-sectional adjustment control.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular materials and embodiments, the invention is not intended to be limited to the particulars disclosed herein; rather, the invention extends to a functionally equivalent structures, methods and uses, such as are within the scope of the appended claims.

What is claimed is:

1. A consistency-controlled headbox of a paper machine, compromising:

a common feed line for a pulp slurry;

a plurality of sections into which the common feed line branches; and means for influencing the composition of the pulp slurry in each of the plurality of sections, wherein a pulp consistency sensor is provided for sectional consistency control and further, wherein the pulp consistency sensor is positioned in a return portion of a pulp distributing line.

2. A consistency-controlled headbox of a paper machine according to claim 1, wherein the pulp consistency control is based on fluctuation control.

3. A consistency-controlled headbox of a paper machine according to claim 1, wherein the pulp consistency sensor uses a light signal as a measuring signal.

4. A consistency-controlled headbox of a paper machine according to claim 3, wherein the pulp consistency sensor includes:

a laser light source; and, a photo diode for capturing the light signal.

5. A consistency-controlled headbox of a paper machine according to claim 4, wherein the pulp consistency sensor uses a microwave signal as a measuring signal.

6. A consistency-controlled headbox of a paper machine according to claim 4, wherein at least one of the plurality of sections is provided with a separate pulp feed line.

7. A control device for a headbox of a paper machine, comprising:

a weight basis cross-sectional adjustment sensor which captures a weight basis cross-sectional profile of a paper web;

a control device for controlling the weight basis cross-sectional profile including a pulp consistency controller and a weight basis cross-sectional adjustment controller in each of a plurality of sections of the headbox, wherein the pulp consistency controller is structured to operate with a significantly higher sensing rate than the weight basis cross-sectional adjustment controller; and means for influencing the composition of a pulp slurry in each of the plurality of sections of the headbox.

8. A control device for a headbox of a paper machine according to claim 7, wherein a set point for the pulp consistency controller is provided by a control computer based on the weight basis cross-sectional profile of the paper web.

9. A control device for a headbox of a paper machine according to claim 7, wherein the pulp consistency controller includes a pulp consistency sensor which generates a differential signal if the pulp slurry consistency varies from a given set point.

10. The consistency-controlled headbox of a paper machine according to claim 9, wherein the pulp consistency sensor is positioned in a turbulence generator.

11. The consistency-controlled headbox of a paper machine according to claim 9, wherein the pulp consistency sensor is positioned in a pulp transfer nozzle.

12. The consistency-controlled headbox of a paper machine according to claim 9, wherein the pulp consistency sensor is positioned in a common feed line.

13. The consistency-controlled headbox of a paper machine according to claim 9, wherein the pulp consistency sensor is positioned in a return line.

14. A control device for a headbox of a paper machine according to claim 7, wherein the plurality of sections of the headbox are constructed with at least one section having a separate pulp feed line.

15. A headbox of a paper machine comprising:

a common feed line for a pulp slurry;

a plurality of sections into which the common feed line branches; and a system for influencing the composition of the pulp slurry in each of the plurality of sections, wherein a pulp consistency sensor is provided for sectional consistency control and further, wherein the pulp consistency sensor is positioned in a return portion of a pulp distributing line.

16. A headbox of a paper machine according to claim 15, wherein the pulp consistency control is based on fluctuation control.

17. A headbox of a paper machine according to claim 15, wherein the pulp consistency sensor uses a light signal as a measuring signal.

18. A headbox of a paper machine according to claim 15, wherein the pulp consistency sensor includes:

a laser light source; and, a photo diode for capturing the light signal.

19. A headbox of a paper machine according to claim 15, wherein the pulp consistency sensor uses a microwave signal as measuring signal.

20. A headbox of a paper machine according to claim 15, wherein at least one of the plurality of sections is provided with a separate pulp feed line.

21. A control device for a headbox of a paper machine comprising:

a weight basis cross-sectional adjustment sensor which captures the weight basis cross-sectional profile of a paper web;

a control device for controlling the weight basis cross-sectional profile, including a pulp consistency controller and a weight basis cross-sectional adjustment controller in each of a plurality of sections of the headbox, wherein the pulp consistency controller is structured to operate at a significantly higher sensing rate than the weight basis cross-sectional adjustment controller; and a system for influencing the composition of a pulp slurry stream in each of the plurality of sections of the headbox.

22. A control device for a headbox of a paper machine according to claim 21, wherein a set point for the pulp consistency controller is provided by a control computer based on the weight basis cross-sectional profile of the paper web.

23. A control device for a headbox of a paper machine according to claim 21, wherein the pulp consistency controller includes a pulp consistency sensor which generates a differential signal if the pulp slurry consistency varies from a given set point.

24. A control device for a headbox of a paper machine according to claim 21, wherein the plurality of sections of the headbox are constructed with at least one section having a separate pulp feed line.

25. The headbox of a paper machine according to claim 21, wherein the pulp consistency controller includes a pulp consistency sensor which generates a differential signal if the pulp slurry consistency varies from a given set point, and wherein the pulp consistency sensor is positioned in a turbulence generator.

26. The headbox of a paper machine according to claim 21, wherein the pulp consistency controller includes a pulp consistency sensor which generates a differential signal if the pulp slurry consistency varies from a given set point, and wherein the pulp consistency sensor is positioned in a pulp transfer nozzle.

27. A consistency-controlled headbox of a paper machine, comprising:

a common feed line for a pulp slurry;

a plurality of sections into which the common feed line branches;

means for influencing the composition of the pulp slurry in each of the plurality of sections, wherein a pulp consistency sensor is provided for sectional consistency control;

a weight basis cross-sectional adjustment sensor which captures a weight basis cross-sectional profile of a paper web; and a control device for controlling the weight basis cross-sectional profile, including a pulp consistency controller and a weight basis cross-sectional adjustment controller in each of the plurality of sections of the headbox, wherein the pulp consistency controller is structured to operate with a significantly higher sensing rate than the weight basis cross-sectional adjustment controller.

28. A headbox of a paper machine, comprising:

a common feed line for a pulp slurry;

a plurality of sections into which the common feed line branches;

a system for influencing the composition of the pulp slurry in each of the plurality of sections, wherein a pulp consistency sensor is provided for sectional consistency control;

a weight basis cross-sectional adjustment sensor which captures a weight basis cross-sectional profile of a paper web; and a control device for controlling the weight basis cross-sectional profile, including a pulp consistency controller and a weight basis cross-sectional adjustment controller in each of the plurality of sections of the headbox, wherein the pulp consistency controller is structured to operate with a significantly higher sensing rate than the weight basis cross-sectional adjustment controller.

29. A headbox of a paper machine, comprising:

a system for influencing the composition of pulp slurry in a machine section; and a pulp consistency sensor provided for sectional consistency control and further, wherein the pulp consistency sensor is positioned in a return portion of a pulp distributing line.

30. The headbox of claim 29, further comprising:

a common feed line for said pulp slurry.

* * * * *